United States Patent [19]

Maruhashi et al.

[11] Patent Number: 4,469,839
[45] Date of Patent: Sep. 4, 1984

[54] PROCESS FOR PREPARING AN AQUEOUS EMULSION OF A POLYMER BY EMULSION POLYMERIZATION IN THE PRESENCE OF AN EMULSIFIER

[75] Inventors: Motokazu Maruhashi, Kusatsu; Sumio Nakagawa, Hirakata, both of Japan

[73] Assignee: Nippon Gohsei Kagaku Kogyo Kabushiki Kaisha, Osaka, Japan

[21] Appl. No.: 458,193

[22] Filed: Jan. 17, 1983

Related U.S. Application Data

[63] Continuation of Ser. No. 275,025, Jun. 18, 1981, abandoned.

[51] Int. Cl.³ .............................................. C08F 2/26
[52] U.S. Cl. .................................. 524/458; 524/560; 526/201; 526/287
[58] Field of Search ................. 526/201; 524/458, 560

[56] References Cited

U.S. PATENT DOCUMENTS

| 3,033,833 | 5/1962 | Le Fevre | 526/287 |
| 3,751,451 | 8/1973 | Samour | 526/287 |
| 3,980,622 | 9/1976 | Kozuka | 526/287 |
| 4,246,387 | 1/1981 | Deutsch | 526/209 |

Primary Examiner—C. A. Henderson

Attorney, Agent, or Firm—Armstrong, Nikaido, Marmelstein & Kubovcik

[57] ABSTRACT

An emulsifier useful for preparing an aqueous emulsion having a high viscosity which comprises a copolymer of (1) at least one monomer selected from a vinyl ester, vinyl alcohol, an alkyl acrylate and an alkyl methacrylate and (2) at least one monomer selected from an acrylic acid derivative of the general formula:

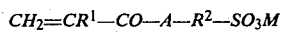

$$CH_2=CR^1-CO-A-R^2-SO_3M$$

and a maleic acid derivative of the general formula:

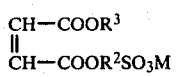

$$\begin{array}{l}CH-COOR^3\\ \|\\ CH-COOR^2SO_3M\end{array}$$

wherein $R^1$ is hydrogen or methyl group, $R^2$ is an alkylene group, $R^3$ is hydrogen, an alkyl group or an alkali metal, M is hydrogen or an alkali metal, and A is —O— or —NR— in which R is hydrogen, an alkyl group or —$R^2SO_3M$. Emulsions prepared by employing the above copolymer as emulsifier have very high viscosities and moreover excellent storage, freeze-thaw and dilution stabilities. The use of the above copolymer in combination with a surface active agent provides emulsions containing scarcely aggregates and coarse particles and having an improved flowability.

6 Claims, No Drawings

PROCESS FOR PREPARING AN AQUEOUS EMULSION OF A POLYMER BY EMULSION POLYMERIZATION IN THE PRESENCE OF AN EMULSIFIER

This is a continuation of application Ser. No. 275,025, filed June 18, 1981 now abandoned.

BACKGROUND OF THE DISCLOSURE

The present invention relates to an emulsifier, and more particularly to an emulsifier useful for preparing aqueous emulsions having a high viscosity.

In emulsion polymerization of unsaturated monomers such as acrylates and vinyl acetate, the use of an emulsifier or protective colloid is essential. Various kinds of non-ionic or anionic surface active agents have hitherto been employed alone or in admixture thereof as emulsifiers, and polyvinyl alcohol or methyl cellulose is employed as protective colloids. The emulsions so obtained are very useful as adhesives, coating materials, fiber and textile processing agents, and the like, but are poor in storage stability, freeze-thaw stability and dilution stability.

In order to improve these defects, it is proposed to employ as emulsifiers or protective colloids, copolymers of vinyl acetate and olefinsulfonic acid salts such as ethylenesulfonic or allylsulfonic acid salts, or the hydrolyzed copolymers thereof. According to the present inventor's study, such copolymers eliminate the above-mentioned defects, but are hard to increase the viscosity of emulsions. In case of coating on porous substrates such as papers and cloths, the low viscosity emulsions are unsuitable because they are absorbed by the substrates, so that desired properties of the coating cannot be sufficiently exhibited. Addition of thickners gives high viscosity emulsions, but is liable to destroy the stability of the emulsions. Accordingly, there is demanded development of an emulsifier enabling to prepare emulsions having a high viscosity.

It is an object of the present invention to provide an emulsifier capable of producing emulsions having a high viscosity as well as excellent storage, freeze-thaw and dilution stabilities.

Another object of the invention is to provide excellent emulsions containing scarcely agglomerates and coarse particles and having an improved flowability in addition to the above-mentioned properties.

These and other objects of the present invention will become apparent from the description hereinafter.

SUMMARY OF THE INVENTION

In accordance with the present invention, there is provided an emulsifier for preparing aqueous emulsions having a high viscosity which comprises a copolymer of (1) at least one monomer selected from the group consisting of a vinyl ester of a carboxylic acid, a vinyl alcohol, an alkyl acrylate and an alkyl methacrylate and (2) at least one sulfo group-containing monomer selected from the group consisting of an acrylic acid derivative of the following general formula (I):

$$CH_2=CR^1-CO-A-R^2-SO_3M \qquad (I)$$

and a maleic acid derivative of the following general formula (II):

(II)

wherein $R^1$ is hydrogen or methyl group, $R^2$ is an alkylene group, $R^3$ is hydrogen, an alkyl group or an alkali metal, M is hydrogen or an alkali metal, and A is —O— or —NR— in which R is hydrogen, an alkyl group or —R$^2$SO$_3$M.

The emulsions containing the copolymers of the present invention as emulsifiers have a high viscosity and excellent storage, freeze-thaw and dilution stabilities. Further, when the copolymer of the invention is employed in combination with non-ionic and/or anionic surface active agents, there can be obtained emulsions containing scarcely agglomerates and coarse particles and having an improved flowability as well as the above excellent properties. The emulsions are prepared by the following processes, i.e. an emulsion polymerization process in which an unsaturated monomer is emulsion-polymerized in an aqueous medium by employing the copolymer of the present invention as an emulsifier, a post-addition process in which the copolymer of the invention is added to an aqueous emulsion obtained by emulsion polymerization of an unsaturated monomer, and a post-emulsification process in which a solution, molten liquid or powder of a synthetic resin is added to an aqueous solution of the copolymer of the invention with agitation.

For instance, when emulsion polymerization of acrylate monomers is carried out by employing the above-mentioned specific copolymer as emulsifiers, there can be obtained emulsions having a higher viscosity than that of emulsions obtained by employing a conventional olefinsulfonic acid salt/vinyl acetate copolymer or the hydrolyzed copolymer thereof as emulsifiers, and moreover the obtained emulsions have excellent storage, freeze-thaw and dilution stabilities which are equal to or more of those of emulsions obtained by employing the olefinsulfonic acid salt/vinyl acetate copolymer or the hydrolyzed copolymer thereof. Thus, the present invention is very industrially useful.

DETAILED DESCRIPTION

In the present invention, as a component (2) of the copolymer there is employed at least one of sulfo group-containing monomers selected from acrylic acid derivatives of the general formula (I):

$$CH_2=CR^1-CO-A-R^2-SO_3M \qquad (I)$$

and maleic acid derivatives of the general formula (II):

(II)

wherein $R^1$ is hydrogen or methyl group, $R^2$ is an alkylene group, $R^3$ is hydrogen, an alkyl group or an alkali metal, M is hydrogen or an alkali metal, and A is —O— or —NR— in which R is hydrogen, an alkyl group or —R$^2$SO$_3$M.

The acrylic acid derivatives (I) employed in the present invention include N-sulfoalkyl acrylamides and methacrylamides of the following general formula (Ia):

$$CH_2=CR^1-CONH-R^2-SO_3M \quad \text{(Ia)}$$

wherein $R^1$, $R^2$ and M are as defined above, e.g. sodium N-sulfoisobutylene acrylamide which is particularly preferred among the compounds (Ia);

N-alkyl-N-sulfoalkyl acrylamides and methacrylamides of the following general formula (Ib):

$$CH_2=CR^1-CON\begin{matrix}R^4\\ \\ R^2SO_3M\end{matrix} \quad \text{(Ib)}$$

wherein $R^1$, $R^2$ and M are as defined above and $R^4$ is an alkyl group having 1 to 5 carbon atoms, e.g. N-ethyl-N-sodium sulfoalkyl acrylamide and N-hydroxyethyl-N-sodium sulfopropyl acrylamide;

N,N-disulfoalkyl acrylamides and methacrylamides of the following general formula (Ic):

$$CH_2=CR^1-CON\begin{matrix}R^2SO_3M\\ \\ R^2SO_3M\end{matrix} \quad \text{(Ic)}$$

wherein $R^1$, $R^2$ and M are as defined above; and sulfoalkyl acrylates and methacrylates of the following general formula (Id):

$$CH_2=CR^1-COO-R^2-SO_3M \quad \text{(Id)}$$

wherein $R^1$, $R^2$ and M are as defined above, e.g. sodium 2-sulfoethyl acrylate and methacrylate, sodium 3-sulfopropyl acrylate and methacrylate, 1-sulfo-2-propyl acrylate and methacrylate, 2-sulfo-1-propyl acrylate and methacrylate, and 2-sulfo-1-butyl acrylate and methacrylate.

The maleic acid derivatives (II) employed in the present invention include sulfoalkyl maleates of the following general formulas (IIa), (IIb) and (IIc):

$$\begin{matrix}CH-COOM\\ \parallel\\ CH-COOR^2SO_3M\end{matrix} \quad \text{(IIa)}$$

$$\begin{matrix}CH-COOR^5\\ \parallel\\ CH-COOR^2SO_3M\end{matrix} \quad \text{(IIb)}$$

$$\begin{matrix}CH-COOR^2SO_3M\\ \parallel\\ CH-COOR^2SO_3M\end{matrix} \quad \text{(IIc)}$$

wherein $R^2$ and M are as defined above and $R^5$ is an alkyl group having 1 to 20 carbon atoms, e.g. sodium sulfopropyl 2-ethylhexyl maleate, sodium sulfopropyl tridecyl maleate, sodium maleate.

In the above formulas, the alkylene group $R^2$ may be straight or branched alkylene groups having 1 to 4 carbon atoms, such as ethylene, propylene and butylene groups, but branched alkylene groups are preferred from the viewpoint of stability of amido bonding. Also, though M in the $-SO_3M$ group is hydrogen or an alkali metal, in general alkali metals such as sodium and potassium are desirable, since free sulfonic acid may decompose vinyl esters of the component (1) at the time of polymerization.

Vinyl esters of carboxylic acids, alkyl acrylates, alkyl methacrylates and vinyl alcohol are employed as a component (1) of the copolymer. The vinyl esters include, for instance, vinyl acetate, vinyl propionate, vinyl butyrate, vinyl valerate, vinyl caproate and vinyl versatate, and vinyl acetate is the most preferably employed. Alkyl groups of the alkyl acrylates and methacrylates may be any alkyl groups having 1 to 4 carbon atoms, e.g. methyl, ethyl, propyl and butyl groups. Vinyl esters of carboxylic acids, vinyl alcohol, acrylates and methacrylates may be employed in admixture thereof. One of the most preferable embodiment is a combination of vinyl acetate and vinyl alcohol.

In the copolymers, it is desirable to employ the sulfo group-containing monomer (2) in an amount of 1 to 20% by mole, especially 3 to 20% by mole and the monomer (1) in an amount of 80 to 99% by mole, especially 80 to 97% by mole, respectively, based on the total amount of the monomers (1) and (2). When the proportion of the monomer (2) is less than 1% by mole, it is difficult to obtain the effects of the invention, and when the proportion of the monomer (2) is more than 20% by mole, it is difficult to prepare good emulsions. In the copolymer containing both vinyl ester and vinyl alcohol as a component (1), the molar ratio of vinyl alcohol to vinyl ester is preferably selected from 0.1 to 0.99.

In preparing the sulfo group-containing copolymers of the present invention by employing vinyl esters of carboxylic acids, alkyl acrylates or alkyl methacrylates as monomer (1), the monomers (1) and (2) are copolymerized in an alcohol solvent. Lower alcohols such as methanol, ethanol and propanol are usually employed. These alcohols may contain a small amount of water. The monomers may be charged at one time or continuously. In order to obtain copolymers having a uniform composition, the polymerization is preferably carried out by adding dropwise the monomer (2) to an alcohol medium in which the monomer (1) is dissolved. In the polymerization, known radical polymerization catalysts are employed, e.g. azobisisobutyronitrile, acetyl peroxide, benzoyl peroxide and lauroyl peroxide. The polymerization temperature is usually selected from about 50° C. to a refluxing temperature. In preparation of copolymers containing vinyl alcohol component, the above vinyl esters/sulfo group-containing monomers (2) copolymers are further hydrolyzed in an alcohol medium such as methanol or ethanol.

The sulfo group-containing copolymers of the present invention may further contain other unsaturated monomers copolymerizable with the monomers (1) and (2), e.g. styrene, alkyl vinyl ethers, acrylamide, methacrylamide, olefins such as ethylene, propylene, α-hexene and α-octene, unsaturated carboxylic acids such as acrylic acid, methacrylic acid, crotonic acid, maleic acid, maleic anhydride, fumaric acid and itaconic acid and their alkyl esters and their alkali metal salts, substituted alkyl acrylates and methacrylates such as 2-hydroxyethyl, dimethylaminoethyl, glycidyl or tetrahydrofurfuryl acrylates and methacrylates. These other copolymerizable monomers are employed in an amount of not more than about 10% by mole based on the total amount of the monomers (1) and (2).

The copolymers containing predominantly vinyl acetate, especially sodium N-sulfoisobutyleneacrylamide/vinyl acetate copolymer, are particularly suitable as emulsifiers. Vinyl acetate copolymers having a high degree of polymerization, namely having an intrinsic viscosity [η] of not less than 0.4 dl./g., produce particularly excellent effects. The intrinsic viscosity, as shown herein, of a copolymer containing vinyl acetate is a value obtained by measuring the viscosity of a 0.1N sodium hydroxide aqueous solution of completely hydrolyzed vinyl acetate/sulfo group-containing monomer (2) copolymers at 30° C.

There has never been prepared vinyl ester copolymers containing sulfo group and having such a high degree of polymerization. The intrinsic viscosity $[\eta]$ of an olefinsulfonic acid salt/vinyl ester copolymer is at most 0.3 dl./g. The reason is that a large amount of medium is required in the copolymerization, since there is no suitable medium having a sufficient solvent power for the both monomers. In such a case, the degree of polymerization is remarkably decreased and no practical emulsifier can be obtained.

In contrast to this, the sulfo group-containing monomers employed in the present invention, vinyl acetate and copolymers thereof have good solubility to the alcohol solvent such as methanol and, therefore, the copolymers having a high degree of polymerization can be easily prepared by decreasing the amount of the medium.

The sulfo group-containing copolymers of the present invention are very useful as emulsifiers for preparing emulsions having a high viscosity. Upon carrying out emulsion polymerization, unsaturated monomers are added at a time or continuously to an aqueous medium containing an emulsifier and a polymerization catalyst and heated with agitation. Although the amount of the emulsifier used varies to some extent depending on the kind of the emulsifier, the desired polymer content of emulsion, or the like, it is usually selected from 1 to 8% by weight based on the total weight of the polymerization system. As polymerization catalysts, usual catalysts can be employed. For instance, potassium persulfate and ammonium persulfate are employed alone or in combination with sodium hydrogensulfite, and also there are employed redox polymerization catalysts such as hydrogen peroxide-tartaric acid, hydrogen peroxide-iron salt, hydrogen peroxide-ascorbic acid-iron salt, hydrogen peroxide-formaldehyde sodium sulfoxylate dihydrate, hydrogen peroxide-formaldehyde sodium sulfoxylate dihydrate-iron salt, and the like.

Although the emulsifiers of the invention can produce excellent effects as stated before, the emulsifiers can also be employed in combination with non-ionic surface active agents such as polyoxyethylene alkyl ethers, polyoxyethylene alkyl phenols, polyoxyethylene polyhydric alcohol esters, fatty acid esters with polyhydric alcohols and oxyethylene-oxypropylene block polymers, polyvinyl alcohol and derivatives thereof; or anionic surface active agents such as higher alcohol sulfates, metal salts of higher fatty acids, polyoxyethylene alkylphenolether sulfates, alkylbenzene sulfonates, condensates of naphthalene sulfonate and formaldehyde, alkyldiphenyl ether sulfonates, dialkylsulfosuccinates and higher alkyl phosphates. These surface active agents may be employed alone or in admixture thereof. In the present invention, the combination use of the sulfo group-containing copolymer with surface active agents is particularly advantageous, since the produced emulsions contain scarcely agglomerates and coarse particles and moreover have an improved flowability as compared with the case using the sulfo group-containing copolymers alone. The admixing ratio of the sulfo group-containing copolymer to the surface active agent is from 1/20 to 20/1 by weight. It is not always necessary to admix them at initial stage of polymerization, and it is possible to employ one component at the initial stage of polymerization and then add the other to the polymerization system in the course of the polymerization.

In emulsion polymerization, other additives, e.g. plasticizers such as phthalates and phosphates, and pH controlling agents such as sodium carbonate, sodium acetate and sodium phosphate may also be employed.

The emulsifiers of the present invention are applicable to emulsion polymerization of ethylenically unsaturated monomers and butadiene monomers. Examples of the ethylenically unsaturated monomer are vinyl acetate, acrylates, methacrylates, vinyl chloride, vinylidene chloride, acrylonitrile, styrene, ethylene, and the like. Especially, the emulsifiers of the invention are very suitable for the homo- and co-polymerization of acrylates and methacrylates among these monomers, since there can be obtained emulsions having particularly excellent mechanical stability, storage stability and miscibility with pigments. Examples of the butadiene monomers are butadiene-1,3, 2-methylbutadiene-1,3, 2,3-dimethylbutadiene-1,3, 2-chlorobutadiene-1,3, and the like. These butadiene monomers may be employed alone or in combination with ethylenically unsaturated monomers. Preferable combinations are combinations of butadiene-1,3 and styrene; butadiene-1,3, styrene and acrylic or methacrylic acid; butadiene-1,3 and acrylonitrile; butadiene-1,3, acrylonitrile and styrene; butadiene-1,3, acrylonitrile and an acrylate or methacrylate; butadiene-1,3 and methyl methacrylate; and butadiene-1,3, methyl methacrylate and acrylic or methacrylic acid.

In the present invention, emulsions having a high viscosity can also be prepared by a post-addition process. The sulfo group-containing copolymer of the present invention is added to an aqueous emulsion prepared by employing as emulsifiers non-ionic or anionic surface active agents or water-soluble protective colloids.

It is further possible to prepare emulsions by post-emulsification process. The emulsifier of the invention is dissolved in water, and then a solution of a resin or a molten resin is added dropwise to the aqueous solution of the emulsifier with agitation. The aqueous solution of the emulsifier may be added dropwise to a solution of a resin or a molten resin with agitation. Heating is not particularly required in emulsification, but if necessary, the temperature is maintained at from 45° to 85° C. Materials to be emulsified are not particularly limited, and for instance, there are mentioned resins such as epoxy resins, urethane resins, urea-formaldehyde precondensate, phenol-formaldehyde precondensate, alkyd resins, ketene dimer, rosin, silicone resins, waxes, polypropylene, polyethylene, asphalt, and the like. The sulfo group-containing copolymers of the invention may be employed, as occasion demands, in combination with various surface active agents as mentioned before, including non-ionic surface active agents such as polyoxyethylene alkyl ethers, polyoxyethylene alkyl phenols, polyhydric alcohol esters, polyvinyl alcohol and polyvinyl alcohol derivatives, and cationic surface active agents such as higher alkyl amine salts. These surface active agents are not always admixed with the sulfo group-containing copolymer, and they may be present in materials to be emulsified. Further, plasticizers such as phthalates and phosphates, and pH controlling agents such as sodium carbonate, sodium acetate and sodium phosphate may also be employed in post-emulsification.

To the emulsions prepared according to the present invention may be added water-soluble high polymers for the purpose of increasing the viscosity. The amount of the water-soluble high polymer added is usually from 5 to 500% by weight based on the solids of the emulsion. Examples of the water-soluble high polymer are polyvinyl alcohol, polyvinyl alcohol derivatives, starches, carboxymethyl cellulose, hydroxymethyl cellulose, methyl cellulose, casein, and the like. These materials may be employed in any suitable forms, e.g. aqueous solution and powder.

The emulsions may further contain other additives such as cross-linking agents, water proofing agents, pigments, dispersing agents, anti-foaming agents and oils.

The emulsions prepared by employing the emulsifiers of the present invention are useful as paper treating agents, adhesives, paints, fiber and textile treating agents, cosmetics, and civil engineering and building materials.

The present invention is more particularly described and explained by means of the following Examples, in which all parts and % are by weight unless otherwise noted.

EXAMPLES 1 AND 2 AND COMPARATIVE EXAMPLES 1 AND 2

A 1,000 ml. glass polymerization vessel equipped with a reflux condenser, a dropping funnel, a thermometer and a stirrer was charged with 850 parts of vinyl acetate, 160 parts of methanol and 0.3 part of azobisisobutylonitrile. The polymerization was carried out at 65° C. for 6 hours, while continuously adding dropwise 200 parts of a 25% methanol solution of sodium N-sulfoisobutyleneacrylamide. The residual monomers were then removed and the produced copolymer was recovered in a usual manner. The copolymer contained 5% by mole of sodium N-sulfoisobutyleneacrylamide and 95% by mole of vinyl acetate, and had an intrinsic viscosity [$\eta$] of 0.91 dl./g.

By employing the thus prepared copolymer as an emulsifier, a polybutyl acrylate emulsion was prepared (Example 1).

A 500 ml. glass polymerization vessel equipped with a reflux condenser, a dropping funnel, a thermometer and a stirrer was charged with 150 parts of a 4.0% aqueous solution of sodium N-sulfoisobutyleneacrylamide/vinyl acetate copolymer (molar ratio: 5/95, [$\eta$]: 0.91 dl./g.) and 5 parts of a 10% aqueous solution of disodium hydrogenphosphate as a pH controlling agent, and the temperature was raised to 65° C. with stirring at a rate of 200 r.p.m. To the vessel were then added 9 parts of butyl acrylate and 1.25 parts of a 4% aqueous solution of potassium persulfate. The initial polymerization was carried out at 65° C. for 30 minutes, and thereafter the polymerization was carried out at 70° C. for 4 hours, while continuously adding dropwise 81 parts of butyl acrylate over 4 hours and adding 5 parts of a 4% aqueous solution of potassium persulfate in two portions. After further maintaining at 75° C. for 1 hour to complete the polymerization, the residual monomer was removed to give an emulsion of polybutyl acrylate.

The above emulsion polymerization procedure was repeated except that sodium 2-sulfoethylmethacrylate/vinyl acetate copolymer (molar ratio: 5/95, [$\eta$]: 0.91 dl.g.) was employed as an emulsifier (Example 2).

Also, as Comparative Examples 1 and 2, the above procedures were repeated except that a mixture of 2.7 parts of a non-ionic surface active agent (commercial name "Nissan Nonion P-230", product of Nippon Oils and Fats Co., Ltd.) and 0.8 part of an anionic surface active agent (commercial name "Nissan Trax H-45", product of Nippon Oils and Fats Co., Ltd.) (Comparative Example 1), and 150 parts of a 4.0% methanol solution of sodium allylsulfonate/vinyl acetate copolymer (molar ratio: 3/97, [$\eta$]: 0.25 dl./g.) (Comparative Example 2) were employed as an emulsifier, respectively, instead of the above copolymer.

The properties of the emulsions are shown in Table 1.

In Table 1 and the following Tables, the storage, freeze-thaw and dilution stabilities were measured in the following manners and were estimated according to criteria in which A shows "no change", E shows "destruction of emulsion" and the state between A and E is ranked into B, C and D.

Storage stability

About 50 g. of an emulsion is allowed to stand at 60° C. for 5 days, allowed to cool for 3 hours and then stirred. The appearance of the emulsion was observed.

Freeze-thaw stability

About 50 g. of an emulsion is maintained at −15° C. for 16 hours, allowed to stand in a constant temperature water bath at 30° C. for 1 hour and then stirred with a glass rod. The appearance of the emulsion was observed.

Dilution stability

An emulsion diluted to 3% in polymer content with distilled water was put in a glass tube of 7 mm. in diameter and 1 m. in length. After sealing the tube, it was allowed to stand for 24 hours at room temprature. The appearance of the emulsion was observed.

TABLE 1

|  | Ex. 1 | Ex. 2 | Com. Ex. 1 | Com. Ex. 2 |
|---|---|---|---|---|
| Viscosity (cP at 20° C.) | 25000 | 15000 | 10 | 2000 |
| Storage stability | A | A | E | B |
| Freeze-thaw stability | A | A-B | E | A-B |
| Dilution stability | A | A | B | B |

EXAMPLES 3 TO 6

By employing emulsifiers shown in Table 2, emulsion polymerization was carried out according to the procedure in Example 1.

The results are shown in Table 2.

TABLE 2

| Ex. No. | Emulsifier | Emulsion Butyl acrylate/vinyl acetate copolymer | | | | Emulsion Polyvinyl acetate | | | |
|---|---|---|---|---|---|---|---|---|---|
|  |  | Viscosity (cP) | Storage stability | Freeze-thaw stability | Dilution stability | Viscosity (cP) | Storage stability | Freeze-thaw stability | Dilution stability |
| 3 | Sodium N—sulfoisobutylene-acrylamide/vinyl acetate copolymer (molar ratio: 10/90, [$\eta$]: 0.80 dl./g.) | 21000 | A | A | A | 35000 | A | A | A |

TABLE 2-continued

| Ex. No. | Emulsifier | Emulsion Butyl acrylate/vinyl acetate copolymer | | | | Emulsion Polyvinyl acetate | | | |
|---|---|---|---|---|---|---|---|---|---|
| | | Viscosity (cP) | Storage stability | Freeze-thaw stability | Dilution stability | Viscosity (cP) | Storage stability | Freeze-thaw stability | Dilution stability |
| 4 | Sodium N—sulfoisobutylene-acrylamide/methyl acrylate copolymer (molar ratio: 5/95) | 15000 | A | A | A | 23000 | A | A | A |
| 5 | Sodium 3-sulfopropyl acrylate/vinyl acetate copolymer (molar ratio: 10/90, [$\eta$]: 0.80 dl./g.) | 13000 | A | A-B | A | 20000 | A | A-B | A |
| 6 | Sodium 2-sulfoethyl acrylate/methyl acrylate copolymer (molar ratio: 5/95) | 15000 | A | A | A-B | 16000 | A | A | A-B |

EXAMPLE 7

A 500 ml. glass polymerization vessel equipped with a refulx condenser, a dropping funnel, a thermometer and a stirrer was charged with 110 parts of a 5.7% aqueous solution of sodium N-sulfoisobutyleneacrylamide/vinyl acetate copolymer (molar ratio: 10/90, [$\eta$]: 1.13 dl./g.) (hereinafter referred to as "copolymer A") as an emulsifier and 10 parts of a 10% aqueous solution of disodium hydrogenphosphate as a pH controlling agent, and the temperature was raised to 70° C. with stirring at a rate of 200 r.p.m. To the vessel were then added 6 parts of butyl acrylate, 6 parts of styrene and 3.1 parts of a 4% aqueous solution of potassium persulfate to initiate emulsion polymerization. After initial polymerization at that temperature for 30 minutes, the polymerization was further continued at 75° C. for 4 hours, while continuously adding dropwise 53 parts of butyl acrylate and 53 parts of styrene over 4 hours and adding 9.4 parts of a 4% aqueous solution of potassium persulfate in two portions. The reaction mixture was further maintained at 75° C. for 1.5 hours to complete the polymerization to give an emulsion of butyl acrylate/styrene copolymer.

The properties of the emulsion are shown in Table 3.

EXAMPLES 8 TO 10

The procedure of Example 7 were repeated except that 110 parts of a 5.7% aqueous solution of the copolymer A was employed in combination with 5 parts of a non-ionic surface active agent (polyoxyethylene nonylphenyl ether, commercial name "NONIPOL 400", product of Sanyo Chemical Industries, Ltd.) (Example 8), 5 parts of an anionic surface active agent (sodium alkyldiphenylether sulfonate, commercial name "ELEMINOL MON-2", product of Sanyo Chemical Industries, Ltd.) (Example 9), or a mixture of 5 parts of an non-ionic surface active agent (polyoxyethylene laurylether, commercial name "NOIGEN ET-170", product of Dai-Ichi Kogyo Seiyaku Co., Ltd.) and 1.25 parts of an anionic surface active agent (sodium polyoxyethylene alkylphenolether sulfate, commercial name "LEVENOL WZ", product of Kao Soap Co., Ltd.) (Example 10).

The properties of the obtained emulsions are shown in Table 3.

EXAMPLE 11

The procedure of Example 10 was repeated except that the copolymer A was replaced with sodium N-sulfoisobutyleneacrylamide/vinyl acetate copolymer (molar ratio: 25/75, [$\eta$]: 1.05 dl./g.) (hereinafter referred to as "copolymer B").

The properties of the obtained emulsion are shown in Table 3.

TABLE 3

| Ex. No. | Emulsifier | Emulsion of butyl acrylate/styrene copolymer | | | | | |
|---|---|---|---|---|---|---|---|
| | | Viscosity (cP) | Storage stability | Freeze-thaw stability | Dilution stability | Aggregate in emulsion (mg.) | Flowability |
| 7 | Copolymer A | 45000 | A | A | A | 500 | B-C |
| 8 | Copolymer A and NONIPOL 400 | 35000 | A | A | A | 11 | A |
| 9 | Copolymer A and ELEMINOL MON-2 | 28000 | A | A | A | 9 | A |
| 10 | Copolymer A, NOIGEN ET-170 and LEVENOL WZ | 39000 | A | A | A | 5 | A |
| 11 | Copolymer B, NOIGEN ET-170 and LEVENOL WZ | 25000 | B | B-C | C | 1200 | C |

(Notes)
1. Aggregate shows the weight of a material unfiltered when passing 100 g. of an emulsion through a filter cloth of 120 meshes.
2. Flowability is estimated by observation with the naked eye according to the following criteria.
A: Good flowability
B: No flowability and creamy state
C: No flowability and sherbet-like state

EXAMPLE 12

The procedure of Example 7 was repeated except that 110 parts of a 5.7% aqueous solution of sodium 2-sulfoethyl acrylate/vinyl acetate copolymer (molar ratio: 10/90, [$\eta$]: 1.13 dl./g.) (hereinafter referred to as "copolymer C") was employed instead of the aqueous solution of the copolymer A.

The properties of the obtained emulsion are shown in Table 4.

EXAMPLES 13 TO 15

The procedures of Example 12 were repeated except that the aqueous solution of the copolymer C was employed in combination with 5 parts of NONIPOL 400 (Example 13), 5 parts of ELEMINOL MON-2 (Example 14), or a mixture of 5 parts of NOIGEN ET-170 and 1.25 parts of LEVENOL WZ (Example 15).

The properties of the obtained emulsions are shown in Table 4.

EXAMPLE 16

The procedure of Example 15 was repeated except that the copolymer C was replaced with sodium 2-sulfoethyl acrylate/vinyl acetate copolymer (molar ratio: 25/75, [η]: 1.05 dl./g.) (hereinafter referred to as "copolymer D").

The properties of the obtained emulsion are shown in Table 4.

TABLE 4

| Ex. No. | Emulsifier | Emulsion of butyl acrylate/styrene copolymer | | | | | |
|---|---|---|---|---|---|---|---|
| | | Viscosity (cP) | Storage stability | Freeze-thaw stability | Dilution stability | Aggregate in emulsion (mg.) | Flowability |
| 12 | Copolymer C | 25000 | A | A | A | 450 | B–C |
| 13 | Copolymer C and NONIPOL 400 | 28000 | A | A | A | 7 | A |
| 14 | Copolymer C and ELEMINOL MON-2 | 29000 | A | A | A | 13 | A |
| 15 | Copolymer C, NOIGEN ET-170 and LEVENOL WZ | 21000 | A | A | A | 4 | A |
| 16 | Copolymer D, NOIGEN ET-170 and LEVENOL WA | 15000 | B | B–C | C | 1200 | C |

EXAMPLES 17 TO 18

By employing emulsifiers shown in Table 3, emulsion polymerization was carried out according to the procedure in Example 1.

The results are shown in Table 5.

TABLE 5

| Ex. No. | Emulsifier | Emulsion Butyl acrylate/vinyl acetate copolymer | | | | Emulsion Polyvinyl acetate | | | |
|---|---|---|---|---|---|---|---|---|---|
| | | Viscosity (cP) | Storage stability | Freeze-thaw stability | Dilution stability | Viscosity (cP) | Storage stability | Freeze-thaw stability | Dilution stability |
| 17 | Sodium N—sulfoisobutylene-acrylamide/vinyl acetate/vinyl alcohol copolymer (molar ratio: 8/59/33, [η]: 0.95 dl./g.) | 13200 | A | A | A | 15000 | A | A | A |
| 18 | Sodium N—sulfoisobutylene-acrylamide/vinyl acetate/vinyl alcohol copolymer (molar ratio: 8/2/90, [η]: 1.01 dl./g.) | 18700 | A | A | A | 17200 | A | A | A |

What we claim is:

1. In a process for preparing an aqueous emulsion of a polymer comprising units of at least one ethylenically unsaturated monomer by emulsion polymerization in the presence of an emulsifier in an aqueous medium, the improvement which comprises employing as an emulsifier a copolymer of (1) a monomer of a vinyl ester of a carboxylic acid and (2) a sulfo group-containing monomer of the following general formula:

$$CH_2=CR^1—CO—A—R^2—SO_3M$$

wherein $R^1$ is hydrogen or methyl group, $R^2$ is an alkylene group, M is hydrogen or an alkali metal, and A is —NR— in which R is hydrogen, an alkyl group or —$R^2SO_3M$, to give an aqueous emulsion having a high viscosity, said monomer (2) being present in an amount of from 1 to 20% by mole based on the total amount of monomers (1) and (2).

2. The process of claim 1, wherein the copolymer has an intrinsic viscosity of not less than 0.4 dl/g.

3. The process of claim 1, wherein the copolymer is a sodium N-sulfoisobutyleneacrylamide/vinyl acetate copolymer.

4. In a process for preparing an aqueous emulsion of a polymer comprising units of at least one ethylenically unsaturated monomer by emulsion polymerization in the presence of an emulsifier in an aqueous medium, the improvement which comprises employing as an emulsifier (A) a copolymer of (1) a monomer of a vinyl ester of a carboxylic acid and (2) a sulfo group-containing monomer of the following general formula:

$$CH_2=CR^1—CO—A—R^2—SO_3M$$

wherein $R^1$ is hydrogen or methyl group, $R^2$ is an alkylene group, M is hydrogen or an alkali metal, and A is —NR— in which R is hydrogen, an alkyl group or —$R^2SO_3M$, said monomer (2) being present in an amount of from 1 to 20% by mole based on the total amount of monomers (1) and (2), and (B) a surface active agent, to give an aqueous emulsion having a high viscosity.

5. The process of claim 4, wherein the ratio of the copolymer (A) to the surface active agent (B) is from 1/20 to 20/1 by weight.

6. The process of claim 4, wherein the copolymer is a sodium N-sulfoisobutyleneacrylamide/vinyl acetate copolymer.

* * * * *